(12) United States Patent
Shirai et al.

(10) Patent No.: US 6,480,266 B2
(45) Date of Patent: Nov. 12, 2002

(54) AUTOFOCUS DISTANCE-MEASURING OPTICAL SYSTEM

(75) Inventors: Masami Shirai, Saitama (JP); Ryota Ogawa, Saitama (JP); Shinichi Suzuki, Saitama (JP); Homu Takayama, Saitama (JP)

(73) Assignees: Asahi Kogaku Kogyo Kabushiki Kaisha, Tokyo (JP); Asahi Seimitsu Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/799,618

(22) Filed: Mar. 7, 2001

(65) Prior Publication Data

US 2001/0021012 A1 Sep. 13, 2001

(30) Foreign Application Priority Data

Mar. 10, 2000 (JP) ........................................ 2000-066230

(51) Int. Cl.⁷ ................................................. G01C 3/08
(52) U.S. Cl. ........................ 356/5.1; 356/4.01; 356/5.01
(58) Field of Search ................................. 356/4.01–5.15

(56) References Cited

U.S. PATENT DOCUMENTS

| | | | |
|---|---|---|---|
| 4,566,773 A | * | 1/1986 | Kaneda ........................ 354/403 |
| 4,916,324 A | * | 4/1990 | Meier .......................... 250/561 |
| 4,935,612 A | * | 6/1990 | Bierleutgeb .............. 250/201.2 |
| 5,283,622 A | * | 2/1994 | Ueno et al. ....................... 356/4 |
| 5,715,101 A | | 2/1998 | Nakamura et al. |
| 5,796,517 A | | 8/1998 | Sensui et al. |
| 5,877,892 A | | 3/1999 | Nakamura et al. |
| 5,923,468 A | | 7/1999 | Tsuda et al. |
| 5,988,862 A | * | 11/1999 | Kacyra et al. ............... 364/578 |
| 6,108,435 A | * | 8/2000 | Mori et al. .................. 382/106 |
| 6,144,021 A | | 11/2000 | Suzuki |
| 6,226,076 B1 | * | 5/2001 | Yoshida ..................... 356/5.06 |
| 6,324,024 B1 | * | 11/2001 | Shirai et al. ................ 359/884 |

* cited by examiner

*Primary Examiner*—Thomas H. Tarcza
*Assistant Examiner*—Brian Andrea
(74) *Attorney, Agent, or Firm*—Greenblum & Bernstein, P.L.C.

(57) ABSTRACT

An autofocus distance-measuring optical system includes a sighting telescope having an objective lens for sighting an object; an optical distance meter which includes a light-transmitting optical system for transmitting a measuring light via the, and a light-receiving optical system for receiving light reflected by the object; a focus detecting device for detecting a focus state of the sighting telescope; and a controller for controlling the sighting telescope to automatically focus on the object in accordance with the focus state detected by the focus detecting device. The focus detecting device is a phase-difference detection type which detects an in-focus state from a pair of images respectively formed by two light bundles which are passed through two different pupil areas. The two different pupil areas are positioned so as not to interfere with any optical elements of the optical distance meter.

13 Claims, 4 Drawing Sheets

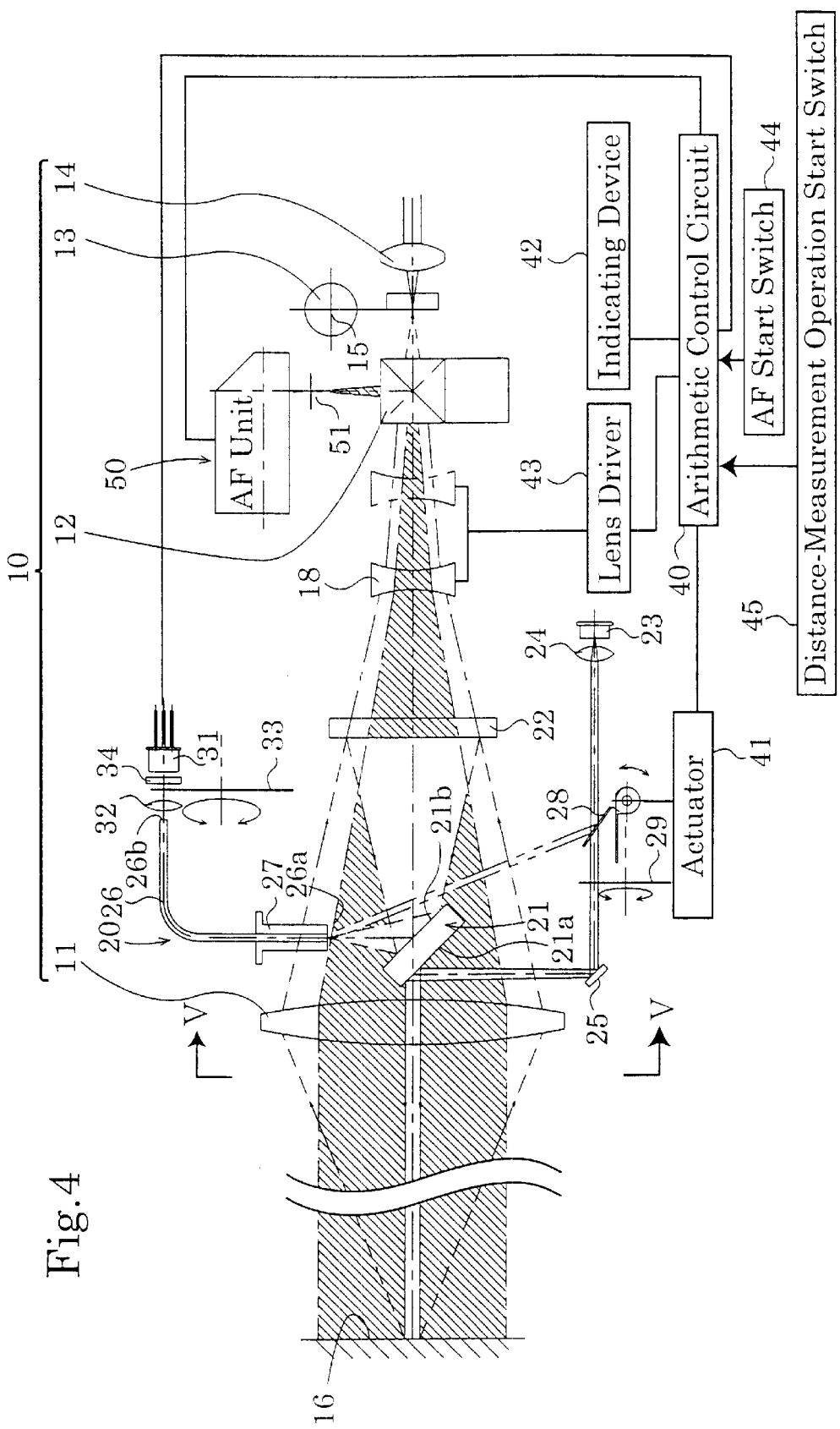

AUTOFOCUS DISTANCE-MEASURING OPTICAL SYSTEM

BACKGROUND OF THE INVENTION

1. Field of the Invention

The present invention relates to an autofocus distance-measuring optical system, equipped with an autofocus system, which can be incorporated in an electronic distance meter, wherein the distance-measuring optical system has a function to measure the distance between two points and also a function to focus a sighting telescope on a sighting object automatically via the autofocus system.

2. Description of the Related Art

A conventional surveying instrument such as a total station has a function to measure the distance between two points and also horizontal and vertical angles. Such a conventional surveying instrument generally measures the distance between two points with an electronic distance meter (EDM) incorporated in or attached to the surveying instrument. The electronic distance meter incorporates an optical distance meter which calculates the distance from the phase-difference or the time difference between the measuring light (externally-projecting light), which is projected toward a target, and the internal reference light.

On the other hand, advancements have been made in the development of surveying instruments provided with a sighting telescope (collimating telescope) having an autofocus system, wherein phase-difference detection type autofocus system is widely used in the autofocus therefor. With this system, an in-focus state is detected based on the correlation between two images formed by two light bundles which are respectively passed through two different pupil areas upon passing through different portions of an objective lens of the sighting telescope to bring the sighting telescope into focus in accordance with the detected in-focus state.

However, if a phase-difference detection type autofocus system is simply incorporated in the electronic distance meter (provided in a surveying instrument), one or more components of the optical distance meter of the electronic distance meter interfere with the two different pupil areas of the phase-difference detection type autofocus system. In other words, the bundle of rays that pass through the two different pupil areas, and pass through different portions of an objective lens of the sighting telescope, interfere with components of the optical distance meter of the electronic distance meter, which deteriorates the precision in focus detection, and thus deteriorates the performance of the autofocus system.

SUMMARY OF THE INVENTION

The present invention has been devised in view of the problems noted above, and accordingly, an object of the present invention is to provide an autofocus distance-measuring optical system, equipped with an autofocus system, which can be incorporated in an electronic distance meter, wherein the optical distance meter thereof does not deteriorate the performance of the autofocus system.

To achieve the object mentioned above, an autofocus distance-measuring optical system is provided, including a sighting telescope having an objective lens for sighting an object; an optical distance meter which includes a light-transmitting optical system for transmitting a measuring light via the objective lens, and a light-receiving optical system for receiving light reflected by the object; a focus detecting device for detecting a focus state of the sighting telescope; and a controller for controlling the sighting telescope to automatically focus on the object in accordance with the focus state detected by the focus detecting device. The focus detecting device includes a phase-difference detection type of focus detecting device which detects an in-focus state from a pair of images respectively formed by two light bundles which are respectively passed through two different pupil areas of the phase-difference detection type of focus detecting device and passed through different portions of the objective lens of the sighting telescope. The two different pupil areas are positioned so that the two light bundles which pass therethrough do not interfere with any optical elements of the optical distance meter.

Preferably, at least one lens element of the objective lens is utilized as a focusing lens group which is moved in accordance with the focus state detected by the focus detecting device.

In an embodiment, the sighting telescope includes an optical system positioned between the objective lens and the focus detecting device, wherein the optical system functions so that the combined focal length of the objective lens and the optical system is longer than the focal length of the objective lens.

In an embodiment, the optical system includes a focus adjustment lens having a negative power, the focus adjustment lens being moved in accordance with the focus state detected by the focus detecting device.

Preferably, the light-transmitting optical system includes a reflection member positioned on an optical axis of the objective lens, wherein the two different pupil areas are positioned so as not to interfere with the reflection member.

Preferably, the optical elements of the optical distance meter are arranged in a direction defined along a line which extends across the diameter of the objective lens and passes through the optical axis of the objective lens. Each of the pupil areas is determined so as to have an elongated shape extending parallel to the above-mentioned direction, so as not to interfere with the optical elements arranged in the direction.

Preferably, the focus detecting device includes a pair of line sensors on which the pair of images are respectively formed by the two light bundles.

Preferably, the focus detecting device includes an AF sensor unit in which the pair of line sensors is accommodated.

According to another aspect of the present invention, an electronic distance meter is provided, including a sighting telescope; an optical distance meter; an AF sensor unit which detects a focus state of the sighting telescope; and a controller for driving an objective lens of the sighting telescope to focus the sighting telescope on a sighting object in accordance with the focus state detected by the focus detecting device. The AF sensor unit includes a phase-difference detection type AF sensor unit which detects an in-focus state from a pair of images respectively formed by two light bundles which are respectively passed through two different pupil areas of the phase-detection type AF sensor unit and passed through different portions of the objective lens of the sighting telescope; wherein optical elements of the optical distance meter are positioned so as not to interfere with the two different pupil areas.

According to another aspect of the present invention, an electronic distance meter is provided, including a sighting telescope including an objective lens and an eyepiece; an optical distance meter; a phase-difference detection type of AF sensor unit which detects an in-focus position from a pair of images respectively formed by two light bundles which are respectively passed through two different pupil areas of said phase-difference detection type of AF sensor unit and passed through different portions of the objective lens; a focus adjustment lens positioned between the objective lens and the eyepiece to extend a focal length of the objective lens; and a controller for driving the focus adjustment lens to focus the sighting telescope on a sighting object in accordance with the in-focus position detected by the focus detecting device; wherein optical elements of the optical distance meter are positioned so as not to interfere with the two different pupil areas.

The present disclosure relates to subject matter contained in Japanese Patent Application No. 2000-066230 (filed on Mar. 10, 2000) which is expressly incorporated herein by reference in its entirety.

BRIEF DESCRIPTION OF THE DRAWINGS

The present invention will be described below in detail with reference to the accompanying drawings in which:

FIG. 4 is a schematic diagram of the second embodiment of an electronic distance meter in which an autofocus distance-measuring optical system is incorporated, according to the present invention;

DESCRIPTION OF THE PREFERRED EMBODIMENT

Figure 1:
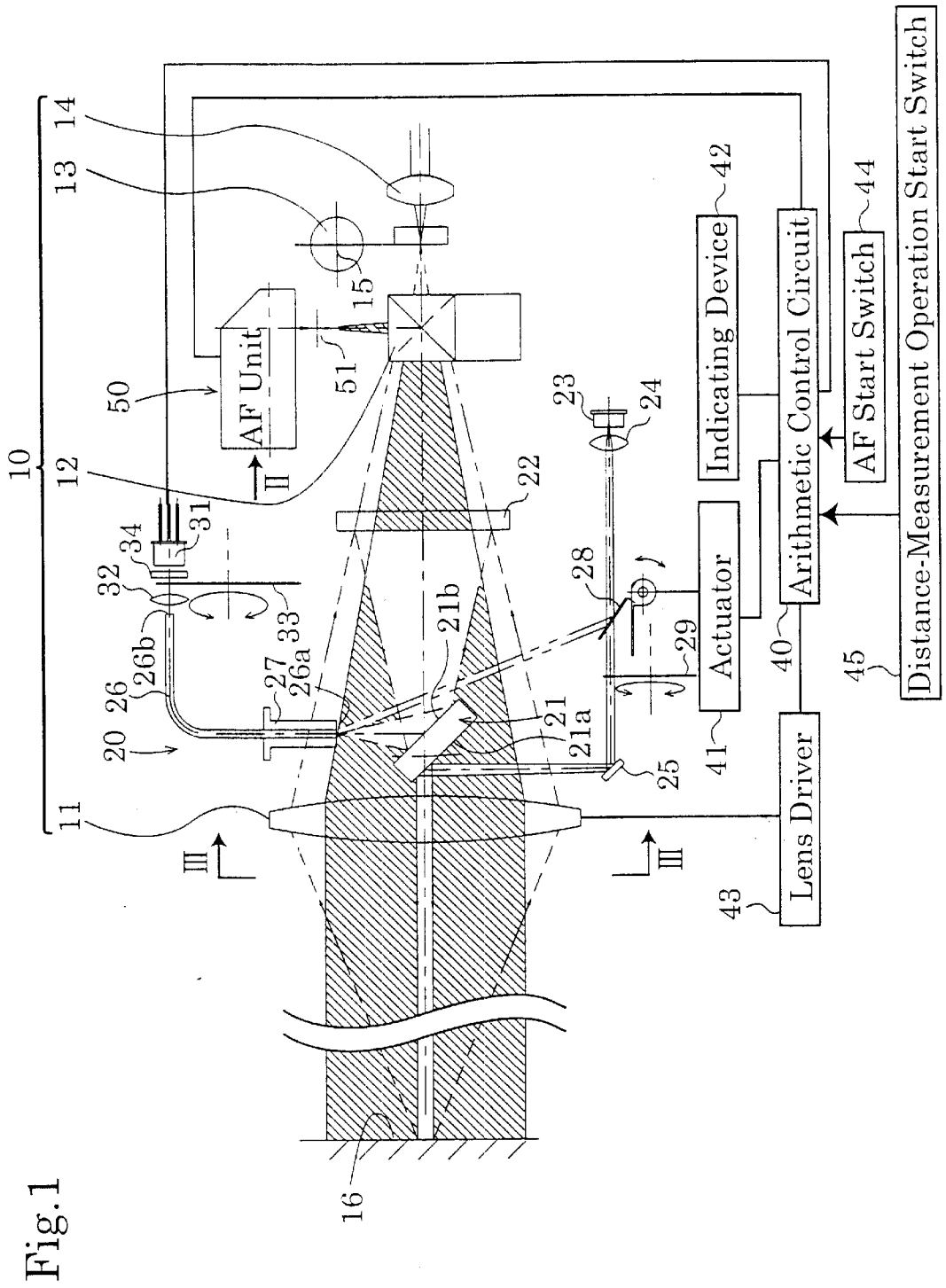
FIG. 1 is a schematic diagram of the first embodiment of an electronic distance meter in which an autofocus distance-measuring optical system is incorporated, according to the present invention.

FIG. 1 shows the first embodiment of an electronic distance meter (EDM) in which an autofocus distance-measuring optical system is incorporated, according to the present invention. The electronic distance meter is provided with a sighting telescope 10 and an optical distance meter 20. As shown in FIG. 1, the sighting telescope 10 is provided with an objective lens 11, a Porro prism (an erecting optical system) 12, a focal-plane plate (a reticle plate) 13, and an eyepiece lens 14, in that order from the object side (i.e., left to right as shown in FIG. 1). The focal-plane plate 13A is provided thereon with a reticle (cross hair) 15. The objective lens 11 is guided in the direction of the optical axis thereof. The image of an object (sighting object) 16 that is formed through the objective lens 11 can be precisely focused on the front surface (the surface facing the objective lens 11) of the focal-plane plate 13 by adjusting the axial position of the objective lens 11 in accordance with the distance of the sighting object 16 with respect to the sighting telescope 10. The user (surveyor) of the surveying instrument sights a magnified image of the sighting object 16, which is focused on the focal-plane plate 13, via the eyepiece 14.

The electronic distance meter is provided, behind the objective lens 11 of the sighting telescope 10, with a light transmitting/receiving mirror (reflection member) 21 and a wavelength selection filter 22, which are arranged in that order from the object side. The light transmitting/receiving mirror 21 and the wavelength selection filter 22 are optical elements of the optical distance meter 20 and constitute a light-receiving optical system. The light transmitting/receiving mirror 21 is made of a parallel-plate mirror having front and rear parallel surfaces positioned on the optical axis of the objective lens 11. The front surface of the parallel-plate mirror which faces the objective lens 11 is formed as a light transmitting mirror 21a, while the rear surface of the parallel-plate mirror which faces the wavelength selection filter 22 is formed as a light receiving mirror 21b.

The optical distance meter 20 is provided with a light-emitting element 23 which emits light (measuring light) having a specific wavelength. The measuring light emitted from the light-emitting element 23 is incident on the light transmitting mirror 21a via a collimating lens 24 and a fixed mirror 25. The measuring light, emitted from the light-emitting element 23 to be incident on the light transmitting mirror 21a, is reflected thereby to proceed toward the sighting object 16 along the optical axis of the objective lens 11. The collimating lens 24, the fixed mirror 25 and the light transmitting mirror 21a (light transmitting/receiving mirror 21) are optical elements of the optical distance meter 20 and constitute a light-transmitting optical system.

The measuring light which is reflected by the sighting object 16 to be passed through the objective lens 11 is reflected back to the light receiving mirror 21b via the wavelength selection filter 22. Thereafter, the light receiving mirror 21b reflects the incident measuring light so as to make the measuring light enter at an incident end surface 26a of a light receiving optical fiber 26. A fiber holder 27 supports the incident end of the light receiving optical fiber 26 which has the incident end surface 26a. The fiber holder 27 is immovably supported together with the light transmitting/receiving mirror 21 by a fixing device (not shown) provided in a space behind the objective lens 11.

The electronic distance meter is provided between the light-emitting element 23 and the fixed mirror 25, on a distance-measuring optical path, with a switching mirror 28 and a first ND filter 29. The measuring light emitted by the light-emitting element 23 is incident on the fixed mirror 25 when the switching mirror 28 is retracted from the optical path between the collimating lens 24 and the fixed mirror 25, and the measuring light (internal reference light) emitted by the light-emitting element 23 is reflected by the switching mirror 28 to be incident directly on the incident end surface 26a of the light receiving optical fiber 26 when the switching mirror 28 is positioned in the optical path between the collimating lens 24 and the fixed mirror 25. The first ND filter 29 is used to adjust the amount of light of the measuring light incident on the sighting object 16.

The electronic distance meter is provided between an exit end surface 26b of the light receiving optical fiber 26 and a light-receiving element 31 with a condenser lens 32, a second ND filter 33 and a band-pass filter 34, in that order from the exit end surface 26b to the light-receiving element 31. The light-receiving element 31 is connected to an arithmetic control circuit (controller) 40. The arithmetic control circuit 40 is connected to an actuator 41 which drives the switching mirror 28, and an indicating device (e.g., an LCD panel) 42 which indicates the calculated distance.

As is known in the art, the optical distance meter 20 establishes two different states: one state wherein the measuring light emitted by the light-emitting element 23 is supplied to the fixed mirror 25, and another state wherein the same measuring light is directly supplied to the incident end surface 26a of the light receiving optical fiber 26, which are determined in accordance with the switching state of the switching mirror 28 driven by the arithmetic control circuit 40 via the actuator 41. As described above, the measuring light supplied to the fixed mirror 25 is projected toward the sighting object 16 via the light-transmitting mirror 21a and the objective lens 11, and the measuring light reflected by the sighting object 16 is incident on the incident end surface 26a via the objective lens 11, the wavelength selection filter 22 (after being transmitted through the transmitting/receiving mirror 21), and the light receiving mirror 21b. Thereafter, both the measuring light reflected by the sighting object 16 to be eventually incident on the incident end surface 26a, and the internal reference light directly supplied to the incident end surface 26a via the switching mirror 28 are received by the light-receiving element 31. The arithmetic control circuit 40 detects the phase-difference or the time difference between the received measuring light and the received internal reference light to calculate the distance from the electronic distance meter to the sighting object 16. The calculated distance is indicated by the indicating device 42. Such an operation (distance-calculating operation) of calculating the distance from the phase-difference or the time difference is well known in the art.

Figure 2:
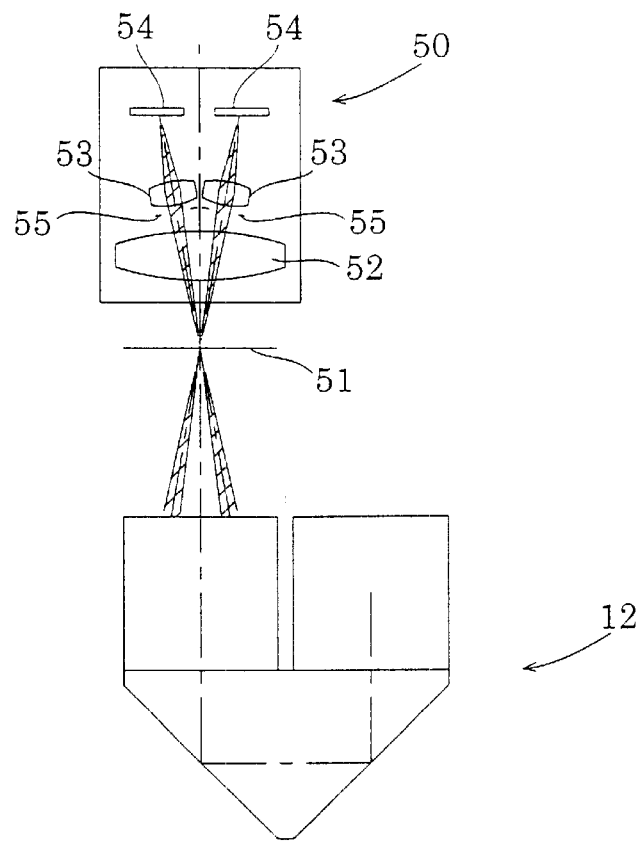
FIG. 2 is a conceptual diagram of a focus detecting device (an AF sensor unit/phase-difference detection type focus detecting device) and a Porro prism, as viewed in the direction of an arrow II shown in FIG. 1.

The Porro prism 12 is provided with a beam splitting surface which splits the incident light bundle into two light bundles, so that one of the two light bundles proceeds toward a phase-difference detection type AF sensor unit (focus detecting device) 50 while the other light bundle proceeds toward the eyepiece 14. Between the Porro prism 12 and the AF sensor unit 50 is formed a reference focal plane 51 which is located at a position optically equivalent to the position at which the reticle 15 of the focal-plane plate 13 is placed. The AF sensor unit 50 detects the focus state (in-focus or out-of-focus state, front or rear focus, and amount of defocus) on the reference focal plane 51. FIG. 2 shows a conceptual diagram of the AF sensor unit 50 and the Porro prism 12. The AF sensor unit 50 includes a condenser lens 52, a pair of separator lenses 53, and a pair of line sensors (e.g., multi segment CCD sensors) 54 located behind the respective separator lenses 53. The pair of separator lenses 53 is arranged apart from each other by the base length. The image of the sighting object 11 formed on the reference focal plane 51 is separated into two images by the pair of separator lenses 53 to be respectively formed on the pair of line sensors 54. Each of the pair of line sensors 54 includes an array of photoelectric converting elements. Each photoelectric converting element converts the received light of an image into electric charges which are integrated (accumulated), and outputs as an integrated electric charge to the arithmetic control circuit 40 to constitute AF sensor data. The arithmetic control circuit 40 calculates an amount of defocus through a predetermined defocus operation in accordance with a pair of AF sensor data respectively input from the pair of line sensors 54. In an autofocus operation, the arithmetic control circuit 40 drives the objective lens 11 to bring the sighting object into focus via a lens driver 43 (see FIG. 1) in accordance with the calculated amount of defocus. The defocus operation is well-known in the art. An AF start switch 44 and a distance-measurement operation start switch 45 are connected to the arithmetic control circuit 40.

The AF sensor unit 50 detects an in-focus state from the pair of images respectively formed on the pair of line sensors 54 by two light bundles which are respectively passed through two different pupil areas 11A and 11B defined on the objective lens 11. The shape of each of the two pupil areas 11A and 11B can be determined by the shape of the aperture formed on corresponding one of a pair of separator masks 55 which are respectively positioned in the vicinity of the pair of separator lenses 53 between the condenser lens 52 and the pair of separator lenses 53. It should be noted that the hatched areas seen in the Figures conceptually indicate areas which correspond to the pupil areas determined by the apertures of the pair of separator masks 55.

Figure 3:
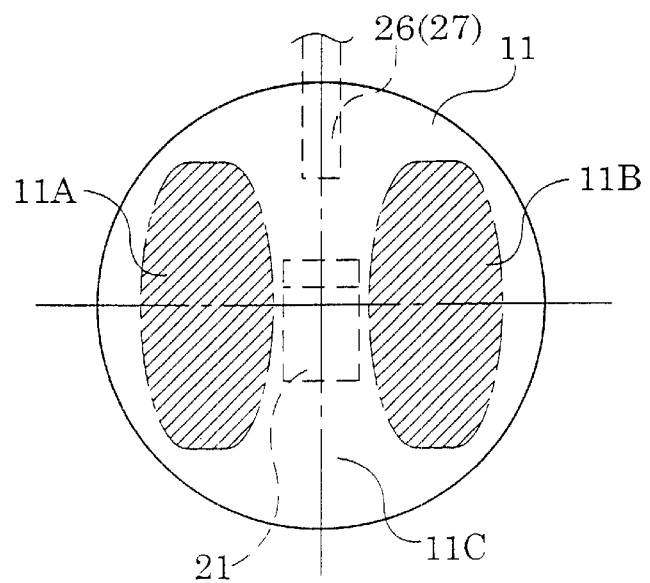
FIG. 3 is an explanatory view of an objective lens of a sighting telescope, as viewed in the direction of the arrows III shown in FIG. 1, showing the positional relationship among a pair of pupil areas defined on the objective lens, a light transmitting/receiving mirror, and a light receiving fiber.

FIG. 3 shows the positional relationship between the two pupil areas 11A and 11B and the positional relationship between the light transmitting/receiving mirror 21 and the light receiving optical fiber 26 (the fiber holder 27) of the optical distance meter 20. Although the positions, shapes and directions of the two pupil areas 11A and 11B are determined by the condenser lens 52, the pair of separator lenses 53, the pair of separator masks 55, and the array of photoelectric converting elements of each line sensor 54 so as to satisfy the performance of autofocus, the directions of the two pupil areas 11A and 11B (the directions of the two pupil areas 11A and 11B relative to the center of the objective lens 11) can be determined relatively freely. Accordingly, the positions of the two pupil areas 11A and 11B are determined so as not to interfere with the light transmitting/receiving mirror 21 and the light receiving optical fiber 26 (the fiber holder 27) of the optical distance meter 20 (and also members for supporting these members (not shown)). In other words, the light transmitting/receiving mirror 21 and the light receiving optical fiber 26 (the fiber holder 27) (and also members for supporting these members) are positioned in an AF shadow area (an AF blind area) 11C between the two pupil areas 11A and 11B. Specifically, the light transmitting/receiving mirror 21 and the light receiving optical fiber 26 (the fiber holder 27) (and also members for supporting these members) are arranged in a direction defined along a line which extends across the diameter of the objective lens 11 and passes through the optical axis of the objective lens 11, while each of the pupil areas 11A and 11B is determined so as to have a shape extending parallel to the line which extends across the diameter of the objective lens 11. This arrangement makes it possible to construct the autofocus distance-measuring optical system in an easy manner so as to prevent components of the optical distance meter 20 from interfering with the two different pupil areas 11A and 11B.

Positioning the two different pupil areas 11A and 11B in such a manner makes it possible to precisely detect an in-focus state of the sighting telescope relative to the sighting object 16, so that the sighting object can be brought into focus with high precision. If any of the light transmitting/receiving mirror 21 and the light receiving optical fiber 26 (the fiber holder 27) (and also members for supporting these members) interfere with one or both of the pupil areas 11B and 11B, the amount of light incident on each of the number of photoelectric converting elements of each line sensor 54 varies, which makes it difficult to bring the sighting object 16 into focus with high precision.

The electronic distance meter in which the autofocus distance-measuring optical system is incorporated, according to the present invention, operates in a manner such as described in the following description. In the first step, a surveyor (user) aims the sighting telescope 10 at the sighting object 16 so that the optical axis of the sighting telescope 10 is generally in line with the sighting object 16, while viewing the sighting object 16 through another sighting instrument (not shown) which is attached to the sighting telescope 10. In the second step, the surveyor depresses the AF start switch 44 to perform the aforementioned autofocus operation to move the objective lens 11 to an in-focus position (in-focus state) thereof relative to the sighting object 16. In the third step, in a state where the sighting telescope 10 is in focus relative to the sighting object 16, the surveyor adjusts the direction of the sighting telescope 10 so that the reticle (cross hair) 15 seen through the eyepiece 14 is precisely centered on the sighting object 16 while looking into the eyepiece 14. In the fourth step, the surveyor depresses distance-measurement operation start switch 45 to perform the aforementioned distance-calculating operation, wherein the calculated distance is indicated on the indicating device 42.

FIG. 4 shows the second embodiment of the electronic distance meter (EDM) in which an autofocus distance-measuring optical system is incorporated, according to the present invention. In the distance-measuring measuring optical system (the optical distance meter 20) shown in FIG. 1, it is advantageous for the focal length of the objective lens 11 to be short so as to increase efficiency of gathering the light which is emitted from the optical distance meter 20 to be reflected by the sighting object 16. This is because of the following reason. Providing the focal length of the objective lens 11 is "f", the diameter φa of the image of the returned measuring light from the sighting object 16 at the position of the light receiving optical fiber 26 can be represented by the following equation:

$$\phi a = \phi A \times f / L$$

wherein "φA" represents the diameter of the transmitted measuring light at a measuring point, "L" represents the distance from the objective lens 11 to the measuring point, and "f" represents the focal length of the objective lens 11.

Figure 6:
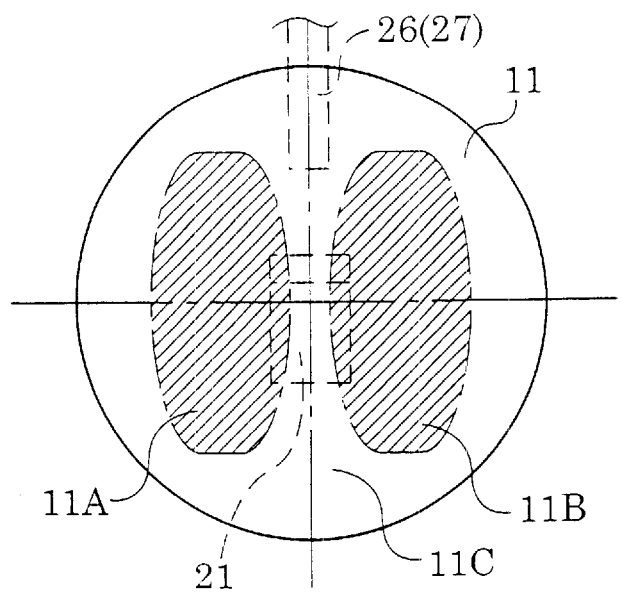
FIG. 6 is a view similar to that of FIG. 5, illustrating the positional relationship among the pair of pupil areas, the light transmitting/receiving mirror, and the light receiving fiber in the distance-measuring optical system equipped with an autofocus system shown in FIG. 4, in the case where no negative lens is disposed between the objective lens and the AF unit.
Figure 5:
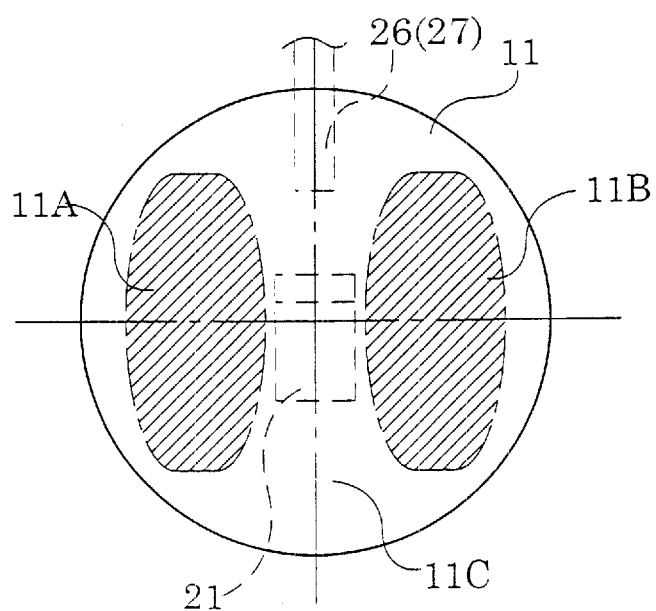
FIG. 5 is an explanatory view of an objective lens of a sighting telescope, as viewed in the direction of the arrows V shown in FIG. 4, showing the positional relationship among a pair of pupil areas defined on the objective lens, a light transmitting/receiving mirror and a light receiving fiber.

Therefore, the diameter φa becomes smaller as the focal length "f" of the objective lens 11 is smaller (shorter). Although the diameter of the light-receiving fiber 26 is small, the light-receiving fiber 26 can capture the whole of the diameter φ if the focal length "f" of the objective lens 11 is sufficiently small. However, shortening the focal length "f" of the objective lens 11 makes the space between the two pupil areas 11A and 11B become narrow as shown in FIG. 6. This makes it difficult to dispose the light transmitting/receiving mirror 21 and the light receiving optical fiber 26 (the fiber holder 27) of the optical distance meter 20 (and also members for supporting these members) within the AF shadow area 11C. Consequently, the light transmitting/receiving mirror 21 and the light receiving optical fiber 26 (the fiber holder 27) of the optical distance meter 20 (and also members for supporting these members) interfere with the two pupil areas 11A and 11B. In the case shown in FIG. 6, the light transmitting/receiving mirror 21 interrupts each of the two pupil areas 11A and 11B.

To prevent such a problem from occurring, in the second embodiment shown in FIG. 4, a focus adjustment lens (optical system) 18 of negative power is disposed between the objective lens 11 and the Porro prism 12 (the AF sensor unit 50). The focus adjustment lens 18 functions to expand the space between the two pupil areas 11A and 11B to thereby make it easy to dispose the light transmitting/receiving mirror 21 and the light receiving optical fiber 26 (the fiber holder 27) of the optical distance meter 20 (and also members for supporting these members) within the AF shadow area 11C. Since the focus adjustment lens 18 is smaller than the objective lens 11, the focus adjustment lens 18 also serves as a focusing lens of the sighting telescope 10 instead of the objective lens 11, so that the focus adjustment lens 18 is guided in the optical axis direction and driven via the lens driver 43 in accordance with the calculated amount of defocus. This structure is advantageous to reduce the moving load on the autofocus optical system.

The function of the focus adjustment lens 18 to expand the space between the two pupil areas 11A and 11B can be explained as follows. The size of the width of the AF shadow area 11C on the objective lens 11 can be represented relatively by the size of the F-number which represents the pupil area of the AF sensor unit 50. Namely, a diameter D (mm) of the AF shadow area 11C can be represented by the following equation:

$$F = E / D$$

wherein "E" represents the focal length (mm) of the objective lens 11, and

"F" represents the F-number which designates the pupil area of the AF sensor unit 50.

Therefore, if the focal length of the objective lens 11 is small, a sufficient width of the AF shadow area 11C cannot be secured unless the F-number which represents the pupil area of the AF unit 50 is reduced. Nevertheless, if the focus adjustment lens 18 is disposed in addition to the objective lens 11, the composite focal length of the objective lens 11 and the focus adjustment lens 18 (i.e., the focal length of the objective optical system) becomes longer. As a result, the AF shadows area 11C having a wide width can be secured without reducing the F-number which represents the pupil area of the AF unit 50.

Sighting and distance-calculating operations of the second embodiment of the electronic distance meter are basically the same as those of the first embodiment of the electronic distance meter except that the focal point of the sighting telescope 10 is adjusted by moving the focus adjustment lens 18 in the second embodiment, while the focal point is adjusted by moving the objective lens 11 in the first embodiment.

It should be noted that the Porro prism 12, which serves as an erecting optical system, and the beam splitting optical system (the aforementioned beam splitting surface formed on the Porro prism 12) for the AF sensor unit 50 can be replaced by similar optical members, since various optical members which function in the same manner are known in the art.

As can be understood from the foregoing, according to an autofocus distance-measuring optical system, equipped with an autofocus system, which can be incorporated in an electronic distance meter, the optical distance meter thereof does not deteriorate the performance of the autofocus system since the positions of the two pupil areas are determined so as not to interfere with any optical elements of the optical distance meter.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An autofocus distance-measuring optical system comprising:
    a sighting telescope having a objective lens for sighting an object;
    an optical distance meter which includes a light-transmitting optical system for transmitting a measuring light via said objective lens, and a light-receiving optical system for receiving light reflected by the object, the light-transmitting optical system having a reflection member;
    a focus detecting device for detecting a focus state of said sighting telescope; and
    a controller for controlling said sighting telescope to automatically focus on the object in accordance with said focus state detected by said focus detecting device,
    wherein said focus detecting device comprises a phase-difference detection type of focus detecting device which detects an in-focus state from a pair of images respectively formed by two light bundles which are respectively passed through two different pupil areas of said phase-difference detection type of focus detecting device and passed through different portions of said objective lens of said sighting telescope; and
    wherein said two different pupil areas are positioned so that said two light bundles which pass therethrough are arranged to pass around the reflection member without being incident on the reflection member.

2. The autofocus distance-measuring optical system according to claim 1, wherein at least one lens element of said objective lens is utilized as a focusing lens group which is moved in accordance with said focus state detected by said focus detecting device.

3. The autofocus distance-measuring optical system according to claim 1, wherein said sighting telescope comprises an optical system positioned between said objective lens and said focus detecting device, wherein the optical system functions so that the combined focal length of said objective lens and said optical system is longer than the focal length of said objective lens.

4. The autofocus distance-measuring optical system according to claim 3, wherein said optical system comprises a focus adjustment lens having a negative power, said focus adjustment lens being moved in accordance with said focus state detected by said focus detecting device.

5. The autofocus distance-measuring optical system according to claim 1, wherein said light-transmitting optical system comprises a reflection member positioned on an optical axis of said objective lens, wherein said two different pupil areas are positioned so as not to interfere with said reflection member.

6. The autofocus distance-measuring optical system according to claim 1, wherein said optical elements of said optical distance meter are arranged in a direction defined along a line which extends across the diameter of the objective lens and passes through the optical axis of said objective lens; and
    wherein each of said pupil areas is determined so as to have an elongated shape extending parallel to said direction, so as not to interfere with said optical elements arranged in said direction.

7. The autofocus distance-measuring optical system according to claim 1, wherein said focus detecting device comprises a pair of line sensors on which said pair of images are respectively formed by said two light bundles.

8. The autofocus distance-measuring optical system according to claim 7, wherein said focus detecting device comprises an AF sensor unit in which said pair of line sensors are accommodated.

9. An electronic distance meter comprising:
    a sighting telescope having an objective lens;
    an optical distance meter including a reflection member;
    an AF sensor unit which detects a focus state of said sighting telescope; and
    a controller for driving the objective lens of said sighting telescope to focus said sighting telescope on a sighting object in accordance with said focus state detected by said focus detecting device,
    wherein said AF sensor unit comprises a phase-difference detection type AF sensor unit which detects an in-focus state from a pair of images respectively formed by two light bundles which are respectively passed through two different pupil areas of said phase-difference detection type AF sensor and passed through different portions of said objective lens of said sighting telescope; and
    wherein optical elements of said optical distance meter are positioned such that the two light bundles which pass through two different pupil areas pass around said reflection member without being incident on the reflection member.

10. An electronic distance meter comprising:
    a sighting telescope including an objective lens and an eyepiece;
    an optical distance meter including a reflection member;
    a phase-difference detection type of AF sensor unit which detects an in-focus position from a pair of images respectively formed by two light bundles which are respectively passed through two different pupil areas of said phase-difference detection type of AF sensor unit and passed through different portions of said objective lens;
    a focus adjustment lens positioned between said objective lens and said eyepiece to extend a focal length of said objective lens; and
    a controller for driving said focus adjustment lens to focus said sighting telescope on a sighting object in accordance with said in-focus position detected by said focus detecting device;
    wherein optical elements of said optical distance meter are positioned such that the two light bundles which are passed through two different pupil areas pass around the reflection member.

11. The autofocus distance-measuring optical system of claim 1, wherein said two different pupil areas are positioned so that said two light bundles which pass therethrough do not interfere with any optical elements of said optical distance meter.

12. The electronic distance meter of claim 9, wherein said optical elements of said optical distance meter are positioned so as not to interfere with said two different pupil areas.

13. The electronic distance meter of claim 10, wherein said optical elements of said optical distance meter are positioned so as not to interfere with said two different pupil areas.

* * * * *